March 20, 1962     E. A. THOMPSON     3,025,675
TIMING COMPENSATOR FOR HYDRAULIC POWER TRANSMISSIONS
Filed May 6, 1957     3 Sheets-Sheet 1

INVENTOR.
EARL A. THOMPSON
BY
ATTORNEYS

INVENTOR.
EARL A. THOMPSON
BY
ATTORNEYS

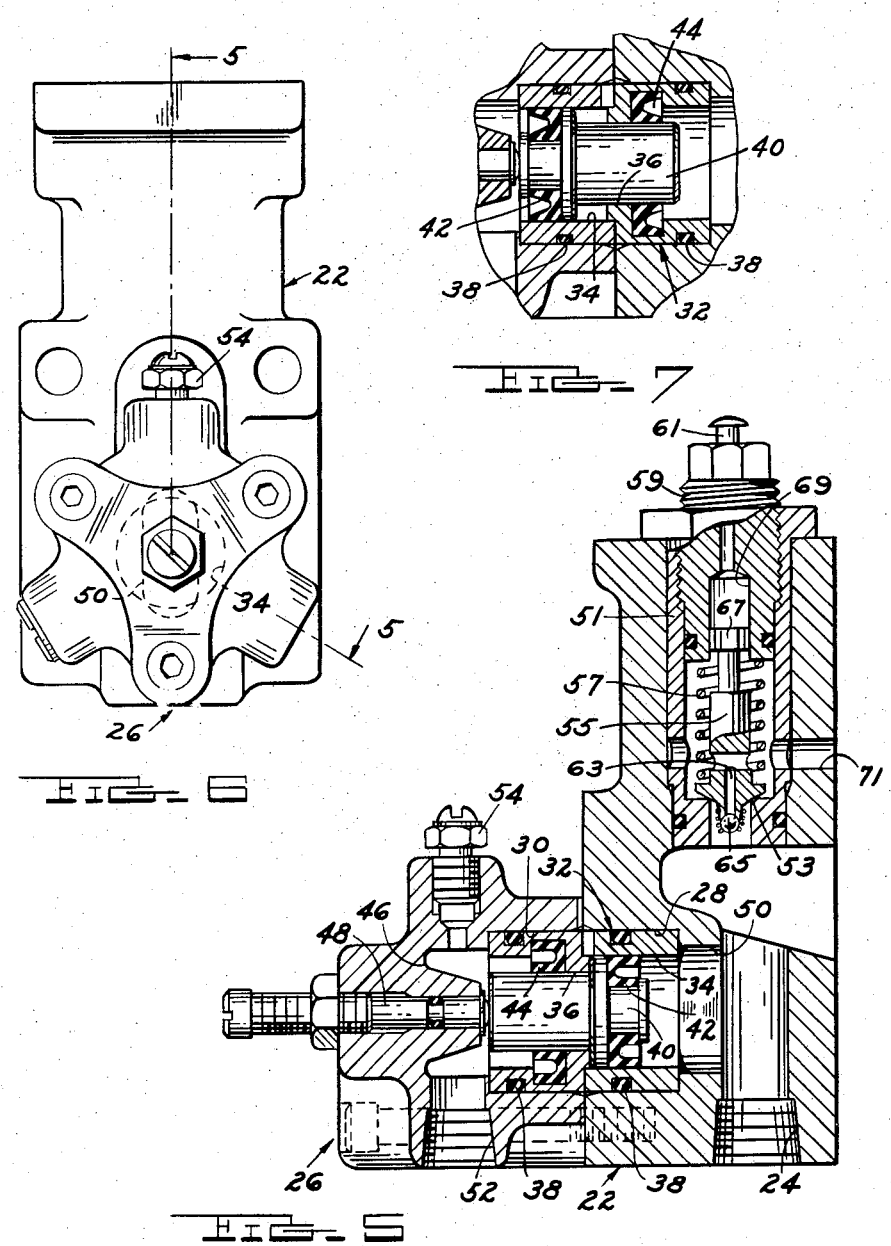

3,025,675
TIMING COMPENSATOR FOR HYDRAULIC POWER TRANSMISSIONS
Earl A. Thompson, Ferndale, Mich.
(1300 Hilton Road, Ferndale Station, Detroit 20, Mich.)
Filed May 6, 1957, Ser. No. 657,361
16 Claims. (Cl. 60—54.5)

This invention relates to a timing compensator for hydraulic power transmission systems and particularly to systems of the type wherein a trapped body of liquid is utilized to provide a drive between a transmitter member and a receiver member. Systems of this class may utilize one or more rotary cams driven from a suitable prime mover to actuate the transmitters, and the receivers may be utilized for driving various machine parts through predetermined cycles in accordance with the contours of the cams.

In devices of this class, the time phase relation of the various receiver movements is determined primarily by the cam contours and their relative angular disposition to one another and to the common driving means. Reference to "timing" or "time-phase" herein is intended in the broad sense which includes spacial, positional or angular relationships as well as chronological ones. Many machine elements require precise adjustment of the timing of their motions with respect to each other or to motions of other elements. With prior art devices it is expensive and time-consuming to make the required modifications in the cams or in their mountings where such adjustments become necessary.

It is an object of the present invention to provide an improved liquid column transmission system for use with cam operated input members in which provision is made for adjustably setting the time phase relation of the receiver movements with respect to the input driving member.

Another object is to provide an improved liquid column transmission system wherein a liquid diverting device may be utilized for the purpose of introducing a variable degree of lost motion between the transmitter and the receiver elements.

A further object is to provide in a system of this character a timing compensator which may be utilized either on the driving portion of a cycle or on the return portion, depending upon its manner of assembly with the other parts of the system.

Further objects and advantages of the present invention will be apparent from the following description, reference being had to the accompanying drawings wherein a preferred form of the present invention is clearly illustrated.

In the drawings:

FIG. 5 is an enlarged view of a timing compensator mechanism assembled for one method of operation.

FIG. 6 is an end view of the structure of FIG. 5.

FIG. 7 is a fragmentary view corresponding to FIG. 5 showing the parts assembled for another method of operation.

In accordance with the present invention, a cam operated, liquid column type of multi-circuit transmission system is utilized for actuating a number of machine elements. Such a system is illustrated in my co-pending application 707,802, filed January 8, 1958 for a Mechanico Hydraulic Power and Control Unit. A system of this character may be utilized for driving the various movable slides of a machine tool, for example, a radius grinder utilized for grinding a spherical face upon the end of a cylindrical part, such as an automotive valve tappet. In a machine of this character, it is desirable to provide for ready adjustment of the time phase relation of various parts of the slide movements with respect to other movements of the same slide or of other slides. This may be provided through the use of a liquid divertor mechanism associated with one or more of the liquid columns so as to introduce a predetermined and adjustable amount of lost motion in the motion transmission. Thus, the effective working stroke of the receiver may be made to commence at a variable point in the cycle of its driving cam.

In providing an adjustable fluid divertor mechanism, or lost motion within the transmitting column of liquid, any critical event in the cycle of a receiving actuator may be made to occur at a point either in time or space which is precisely adjustable. The divertor mechanism is furthermore so arranged that it may be utilized either to vary the timing on the driving stroke of a receiver or upon its return stroke, depending upon the way in which the divertor mechanism is assembled in relation to its particular transmission column.

Figure 1:
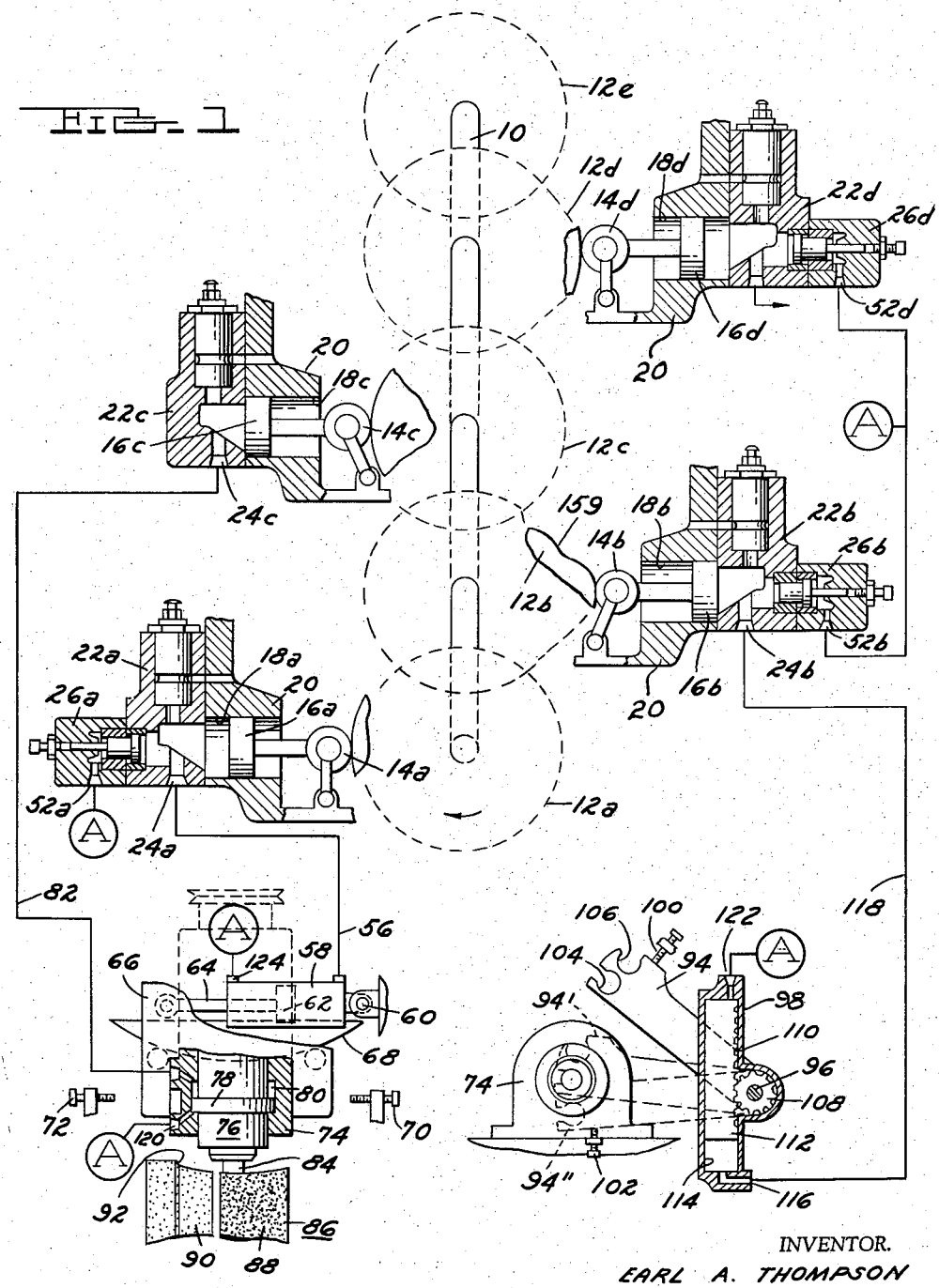
FIG. 1 is a diagrammatic view of a power transmission system incorporating a preferred form of the present invention.

Referring now to FIG. 1, there is shown a cam shaft 10 which may be driven from a suitable prime mover, not illustrated, so as to perform successive cycles of one revolution (or a whole fraction thereof) each. Fixedly secured to the cam shaft 10 are a plurality of cams, 12a, 12b, 12c, 12d and 12e, etc. Arranged alternately on opposite sides of the cam shaft are a set of corresponding followers 14a–14d to which are connected transmitter pistons 16a–16d. The transmitter pistons operate in transmitter cylinders 18a–18d which are formed in the housing enclosing cam shaft 10, parts of which are illustrated at 20. Closing the head end of each cylinder 18 is a combination cylinder head and relief-replenishing valve generally designated 22, and having a connection fitting 24 to which a liquid column receiver element can be connected. The cylinder heads 22a, 22b and 22d carry diverter units 26a, 26b and 26d, and the head 22c does not.

The construction of the liquid divertor mechanism is illustrated in FIGS. 5 and 6, from which it will be seen that the main body of the relief-replenishing valve is provided with a bore 28 which is open to the connection 24 and that the divertor body 26 has a corresponding bore 30 in alignment therewith and of the same diameter. Positioned within the bores 28 and 30 is a divertor cartridge generally designated 32 and consisting of a large diameter cylinder liner 34 and a small diameter cylinder liner 36, sealed to their respective bores by O-rings 38. A differential area floating piston 40 is slideably mounted within the cylinder bores 34 and 36 and carries a cup packing 42 for slideably sealing its engagement with the former. The cylinder liner 36 carries a cup packing 44 for sealing the small diameter portion of the piston 40. The left hand end of the bore 30 is closed by a wall 46 which carries a threaded adjustable stop plunger 48 for the purpose of limiting the stroke of piston 40 in its leftward stroke. The edges of opening 50, which is non-circular (see FIG. 6), limit its stroke in the opposite direction. A conduit connection 52 is provided in the divertor body 26 for communication with the small end of piston 40 and an air bleed valve 54 is provided for bleeding air from this chamber.

The relief and replenishing valve structure includes a body sleeve 51 retained in a vertical bore of the unit 22.

The sleeve 51 has a seat 53 for a relief valve 55 biased on the seat by a spring 57. An adjusting screw 59 is threaded in the upper end of body sleeve 51 and has a bleed valve 61 at its upper end. The relief valve 55 has a passage 63 at its lower end which is closed by a spring loaded, ball type, replenishing valve 65. A fluted piston 67 is carried by the upper end of relief valve 55 to slide in a cylindrical chamber 69 for guiding and damping the vertical movement of the relief valve. A passage 71 communicates between the interior of the cam case, which is an oil reservoir, and the interior of body sleeve 51 above the seat 53.

A typical application of the system above described is shown in FIG. 1, wherein the transmitter 16a drives the table of a radius grinder to feed the work piece across the face of the grinding wheel and the transmitter 16c is utilized to advance and retract the work piece toward and away from the grinding wheel in the direction of the axis of the work piece. Transmitter 16b is utilized for driving a loading and unloading arm to automatically handle unfinished and finished work pieces in between grinding cycles.

Thus, a conduit 56 connects with a port 24a and has its other end connected to the head end of receiver 58 to form with the transmitter 16a and divertor 26a a closed liquid column. The receiver may be in the form of a conventional hydraulic cylinder trunnioned at 60 to a suitable portion of the base of the machine and having a piston 62, the rod 64 of which is pivoted at its end portion to the work table 66 of the grinding machine. The latter is mounted on suitable ways, not shown, for motion in a circular traverse determined by a cam 68. Adjustable stops 70 and 72 limit the stroke of the table 66 at each end.

Mounted rigidly upon the table 66 is a work spindle assembly 74 having a spindle and chuck 76 provided with a piston portion 78 which is reciprocable within a cylinder 80 provided in the housing of the spindle assembly 74. The upper end of cylinder 80 is connected by a conduit 82 with the port 24c. Thus, transmitter 16c, receiver 78—80 and conduit 82 form another closed liquid column. The spindle 76 carries a work piece 84 in the position to sweep across the arcuate face of a toroidally contoured grinding wheel 86 having a coarse section 88 and a fine section 90 provided with an angular shoulder 92 for a purpose later to be described.

The spindle assembly 74 is also indicated in end view in the right hand portion of FIG. 1 and has association there with a loading arm 94 which is journalled at 96 in housing 98. The arm 94 is oscillatable between adjustable stops 100 and 102 and carries in its outer end a pair of cylindrical pockets 104 and 106 for the reception of a finished and unfinished work piece respectively. The arm 94 is actuated by a pinion 108 which meshes with a rack 110 formed on a double acting piston 112. The latter is reciprocably mounted in a cylinder 114. A connection 116 at the lower end of cylinder 114 connects by a conduit 118 with the port 24b. There is thus formed a third liquid column including transmitter 16b, divertor 26b and receiver 114.

Since the liquid column transmitters 16 are all of them of the single acting type, means is provided for exerting a resilient return bias upon all of the receivers for the purpose of driving the machine elements on their return strokes as well as holding the followers 14 against their cams at all times. Such a biasing means can be conveniently provided by a hydraulic accumulator system in which oil under a predetermined high pressure may be maintained. In FIG. 1, the accumulator system is indicated by a circle containing the letter "A" and although a number of these circles are shown, it will be understood that a common accumulator may be connected to all of the ports so shown. These are the port 120 at the lower end of cylinder 80, the port 122 at the upper end of cylinder 114, the port 124 at the rod end of cylinder 58, and the ports 52a, 52b, and 52d. Thus all of the reivers and all of the divertors are resiliently biased in opposition to their respective transmitters.

The divertor 26a is assembled as shown in FIG. 5 so that the large area of piston 40 is exposed to the transmitter 16 and the small area is exposed to the biasing pressure of the accumulator. The divertor 26b is assembled oppositely as seen in FIG. 7.

In operation, the liquid columns having all been filled with oil and properly bled, when the cam shaft 10 is rotated, the followers 14 will be actuated outwardly and inwardly in accordance with the particular contour of each cam. This contour is designed so as to produce the desired movement of the load device, plus a small excess. In the case of the transmitter 16c and its associated liquid column, the cam is so designed that the displacement of the transmitter 16c is only slightly in excess of the displacement of the receiver 78—80.

As explained in the aforementioned co-pending application, the relief and replenishing valve 22c permits relief of this excess (minus any small leakage which may have taken place) at the end of the outward stroke of transmitter 16c, that is, when piston 78 abuts the lower end of cylinder 80. Upon the return stroke of the transmitter 16c inwardly, the biasing force of accumulator pressure at port 120 drives the piston 78 upwardly and holds follower 14c in contact with the cam 12c until piston 78 strikes the upper end of cylinder 80. Thereafter, the replenishing valve opens, permitting the oil from the replenishing supply, which is maintained under a small pressure head, to enter the liquid column and force the piston 16c back to its maximum retracted position as determined by the lowest point on the cam.

Figure 2:
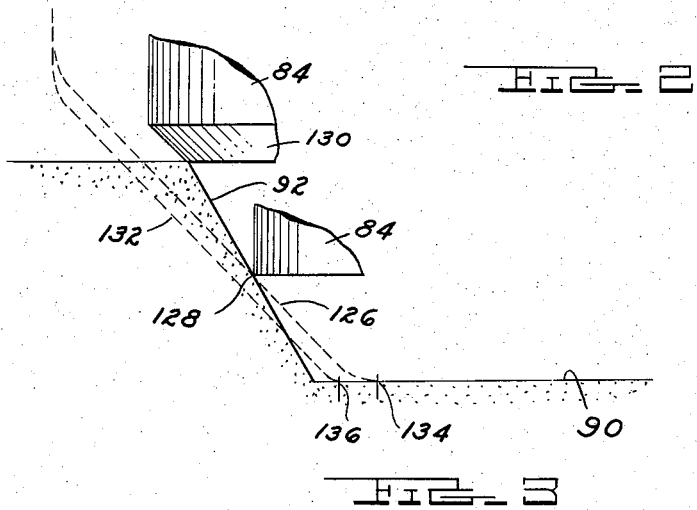
FIG. 2 is an enlarged fragmentary view of a portion of a grinding wheel showing the path of a part being ground.

Cams 12a and 12b are designed to produce a stroke of their respective transmitters which includes not only an execess displacement for relief and replenishing, but also an excess for actuating the divertor piston through its full stroke. Since the small area of the divertor 26a is exposed to accumulator bias and since the area differential is greater than the area differential of piston 62, the transmitter 16s has a better mechanical advantage over the divertor. Consequently, the first outward stroke of transmitter piston 16a will cause actuation of the divertor piston from its right hand to its left hand position in FIG. 1. When the divertor piston has been shifted fully to the left against the adjustable stop pin 48, then further displacement of liquid by the transmitter piston 16a results in motion of the receiver piston 62 and at this point the table 66 starts to move to the left. This motion continues, carrying the work piece 84 in a grinding traverse across the face of grinding wheel 86 until a point is reached somewhat past the shoulder 92. The cams 12a and 12c are so phased in their respective timing that transmitter 16c starts an inward stroke at a point a little before the work piece contacts the shoulder 94 of the grinding wheel. Since there is no divertor associated with transmitter 16c, the piston 78 immediately starts to move upwardly, retracting the work piece from the grinding wheel. The contours of cams 12a and 12c are so formed that the path of the work piece partakes of a resultant motion along the path indicated by the dotted line 126 in FIG. 2. This causes the corner of the cylindrical work piece 84 to strike the shoulder 92 at some predetermined point such as 128, whereby the corner is chamfered as shown in 130.

The amount of chamfer is usually desired to be quite small and only enough to "break" the corner so as to eliminate burrs. The amount of chamfer will depend upon whether the path of the corner of the work piece indicated at 126 intersects the shoulder 92 at a higher or lower point thereon, such for example as is shown by the alternative dotted line 132. The work piece will take the path 126 when the time phasing of receivers 78 and 62 is such that the start of retraction of spindle 76 occurs when the work piece has been traversed to the point 134 by the actuator 62. To make a larger chamfer on the work piece 84, the traverse should be advanced in phase so that the work piece has reached the point 136 at the time when retraction begins. Since this adjustment may need to be made frequently as the grinding wheel is dressed down, it is desirable to have a convenient means for making it and the present invention provides this through the divertor adjustment screw 48.

Figure 3:
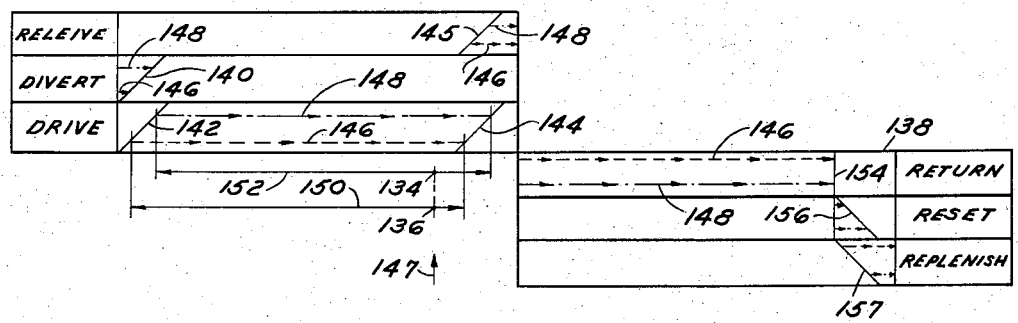
FIG. 3 is a timing diagram of one branch of the system shown in FIG. 1.

The method of compensating for the timing or phasing between actuators 78 and 62 is best understood from consideration of the timing diagram shown in FIG. 3. In this diagram, there is plotted along the horizontal datum line 138 a timing interval represented by a part o fone revolution of the cam shaft 10. This represents the time of one complete out and in stroke of transmitter 16a. The vertical divisions represented above the line 138 are the three possible places where the displacement of the transmitter 16a may go; namely, to drive the receiver, or to be diverted into the divertor, or to be relieved through the relief valve. Below the line and on the right hand half of the diagram, the three possible places from which returning oil may flow into the transmitter 16a are shown respectively as returning from the receiver, resetting of the divertor and replenishing through the replenishing valve.

Starting at the left hand edge of the diagram, the first displacement of transmitter 16a goes to the divertor. Since this may be a variable amount, a diagonal line 140 is used to indicate adjustability and a corresponding diagonal line 142 shows the beginning of the driving action. Since the driving action takes place, for a given setting of the table stops 70 and 72, through the same distance or displacement of receiver 62, a parallel slanting line 144 indicates the termination of driving action. This occurs when the table 66 abuts the stop 72. Thereafter, the remainder of the stroke of transmitter 16 is utilized in spilling oil over the relief valve as shown to the right of slant line 145 at the top center portion of the diagram.

A single cycle can be traced on this diagram as shown by the dotted lines 146 and the dot-dash lines 148. For a short stroke adjustment of the divertor, dotted lines 146 will be representative; from which it will be seen that the stroke of the receiver is that shown by the double ended arrow 150. For a long stroke setting of the divertor, dashed line 148 is representative and results in a receiver stroke as shown by the double ended arrow 152. If mark 147 be considered the timing point where receiver 78—80 starts to retract the work spindle, then by projecting that point upwardly to arrow 152 the timing point 134 (see FIG. 2) is indicated, and by projection onto arrow 150 the timing point 136 is indicated. It is apparent that these points occur at different intervals (of time and of table travel) from the start of the table stroke.

Upon the return stroke which is shown at the right hand half of FIG. 3, the accumulator pressure has the greatest mechanical advantage over the pressure in the liquid column when it acts through the piston 62. Therefore, the first action is a return of the receiver to the point indicated by the vertical line 154. This represents the position of the table 66 when it rests against the stop 70. Thereafter, the divertor is reset until a point is reached along the diagonal line 156 which depends upon the setting of the divertor adjustment screw. When the divertor has completed its return movement, the remainder of the available stroke of transmitter 16a is utilized in replenishing as shown to the right of the diagonal line 157. The effect of short and long adjustments of the divertor stroke are correspondingly indicated by the dotted line 146 and the dot-dash line 148, although this has no effect upon the timing of the table stroke in returning.

The actuation of the loader arm 94 requires adjustability of the receiver stroke during the return portion thereof; since it is desirable to actuate the loader arm on its downward stroke by the accumulator bias rather than transmitter column pressure. Because the loader is provided with two pockets, each of which must be accurately positioned opposite the center of the spindle assembly 74, the cam contour 12b has a receding ramp which is provided with a step or dwell 159 which enables the loader arm to pause for a short interval in the position shown in dotted lines at 94'. This enables the finished piece to be ejected from the work spindle into pocket 104. Thereafter, the cam 12b is contoured to permit the arm 94 to move down against the stop 102 as shown at 94" so that pocket 106 is opposite the spindle center. An ejection mechanism, not shown, can then push the unfinished part into the spindle collet for the next grinding operation. The location of the stop position of the arm 94 for loading an unfinished work piece is readily adjustable by means of the stop screw 102, but the intermediate position is not so readily adjustable without the use of the present invention.

Figure 4:
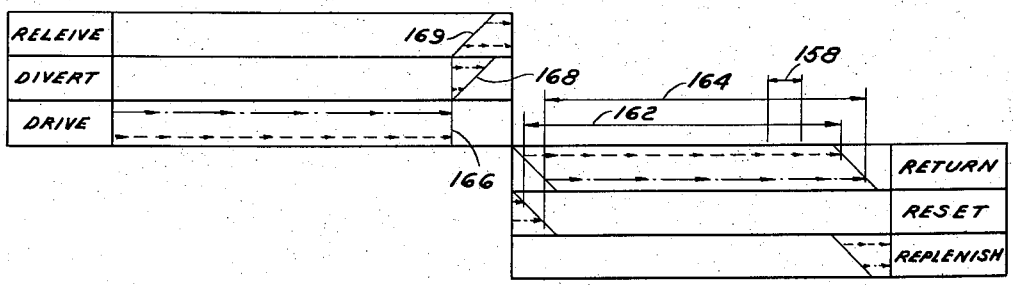
FIG. 4 is a timing diagram of another branch of the system shown in FIG. 1.

In considering the operation of this portion of the mechanism, the timing diagram in FIG. 4 is helpful. This uses the same conventions as FIG. 3. Since the loading arm is shown in its uppermost position in FIG. 1, and the transmitter 16b is at the outermost limit of its stroke, the loading cycle will start at the middle point of FIG. 4. At this time, the divertor 26b is in its right hand position in FIG. 1.

As cam 12b recedes from the transmitter 16b, accumulator pressure has the greatest mechanical advantage over the pressure in the liquid column by acting through the divertor 26b. Thus, the first operation is that of the divertor and is illustrated in FIG. 4 by the triangle at the lower center of the diagram. When the divertor has been fully reset, accumulator pressure acting over the top of the receiver piston 112 then becomes effective to drive the arm 94 down to the position 94'. This position is determined by the dwell on cam 12b. The dwell point is shown in FIG. 4 by an arrow 158 above the representative stroke arrows 162 and 164. It is clear, therefore, that the start of the dwell will occur at any selected interval (of time or loader arm travel) after the start of the receiver return stroke. Thus, the position of the pocket 104 with respect to the spindle collet may be adjusted by adjusting the divertor stroke. This is accomplished moreover without disturbing the adjustments of the limit stops 100 and 102.

When the cam dwell 159 has passed under the follower 14b, the transmitter piston 16b again resumes its inward movement and the receiver piston 112 continues downwardly until arm 94 reaches the adjustable stop 102. Thereafter, the remaining displacement is utilized in replenishing as is shown in the lowermost triangle in FIG. 4. It will be seen that a short stroke divertor adjustment is again indicated by a dotted line and a long stroke one by a dot-dash line.

The motion of the arm 94 upwardly is performed by the transmitter 16b on its driving stroke. This is shown in the left half of FIG. 4. Since the liquid column has the greater advantage over the bias by acting through the receiver piston 112, the first displacement of the transmitter is utilized in driving the receiver until a point is reached, indicated by the vertical line 166. Thereafter, the divertor is operated to divert the amount of liquid determined by its adjustment along the inclined line 168 and the remainder of the transmitter displacement goes over the relief valve as shown to the right of the slant line 169.

It will thus be seen that the present invention provides a means whereby any one of a plurality of cam operated liquid column transmitter circuits may be adjusted as to their timing. This adjustment furthermore may be made for the purpose of co-ordinating the time phase of one receiver with respect to another, such as is the case in the control of the table cross feed with respect to the spindle retraction, in the example here illustrated. Likewise, the invention provides for the adjustment of time phasing of a particular event in the cycle of a single receiver, this being illustrated by the control of the dwell position of the loading arm in the example here shown.

Furthermore, the present invention provides a ready means for making time phase adjustments in devices of this character for events occurring either on the driving stroke or upon the return stroke. This is done conveniently by merely assembling the same set of divertor cartridge parts in either one position or another as shown in FIGS. 5, 6, and 7.

While the form of embodiment of the invention as herein disclosed constitutes a preferred form, it is to be understood that other forms might be adopted, all coming within the scope of the claims which follow.

What is claimed is as follows:

1. In a cam operated, liquid column, motion transmitting system, the combination of power driven cam shaft having a cam thereon, a positive displacement transmitting element operated by the cam, a positive displacement receiving element connected to actuate a load device, a positive displacement diverting element having an adjustable stroke, means forming a closed liquid column connecting the three displacement elements for free interchange of liquid, biasing means for the receiving element and for the diverting element arranged to exert a higher bias opposing the transmitting element upon one of them than upon the other whereby the receiving element may be actuated at an adjustable point of time in the rotation of the cam.

2. A power transmission system for actuating a plurality of load devices from a rotary prime mover comprising in combination a rotary cam shaft driven by the prime mover, a plurality of cams upon the cam shaft, individual positive displacement liquid transmitters operated by the cams, individual positive displacement liquid receivers mechanically connected one to each load device, individual conduit means forming a liquid column connecting each transmitter with its respective receiver and a positive displacement liquid divertor having an adjustable displacement connected to at least one of the liquid columns whereby the phase relation of the actuating stroke of the one receiver with respect to the stroke phase of another receiver may be varied.

3. In a cam operated, liquid column, motion transmitting system, the combination of a power driven cam shaft having a cam thereon, a positive displacement transmitting element operated by the cam, a positive displacement receiving element connected to actuate a load device, a positive displacement diverting element having an adjustable stroke, means forming a closed liquid column connecting the three displacement elements for free interchange of liquid, biasing means for the receiving element and for the diverting element including a differential piston, and arranged to exert a higher bias opposing the transmitting element upon one of them than upon the other whereby the receiving element may be actuated at an adjustable point of time in the rotation of the cam.

4. In a cam operated, liquid column, motion transmitting system, the combination of a power driven cam shaft having a cam thereon, a positive displacement transmitting element operated by the cam, a positive displacement receiving element connected to actuate a load device, a positive displacement diverting element having an adjustable stroke, means forming a closed liquid column connecting the three displacement elements for free interchange of liquid, biasing means for the receiving element and for the diverting element including a cartridge assembly of differential area cylinder and piston parts, and arranged to exert a higher bias opposing the transmitting element upon one of them than upon the other whereby the receiving element may be actuated at an adjustable point of time in the rotation of the cam, said cartridge being reversible end-for-end to place the higher bias either upon the receiving element or upon the diverting element.

5. In a cam operated, liquid column, motion transmitting system, the combination of a power driven cam shaft having a cam thereon, a positive displacement transmitting element operated by the cam, a positive displacement receiving element connected to actuate a load device, a positive displacement diverting element having an adjustable stroke, means forming a closed liquid column connecting the three displacement elements for free interchange of liquid, a pressurized liquid accumulator forming a common biasing means for the receiving element and for the diverting element, and arranged to exert a higher bias opposing the transmitting element upon one of them than upon the other whereby the receiving element may be actuated at an adjustable point of time in the rotation of the cam.

6. In a cam operated, liquid column, motion transmitting system, the combination of a power driven cam shaft having a cam thereon, a positive displacement transmitting element operated by the cam, a positive displacement receiving element connected to actuate a load device, a positive displacement diverting element, including a differential piston having an adjustable stroke, means forming a closed liquid column connecting the three displacement elements for free interchange of liquid, a pressurized liquid accumulator forming a common biasing means for the receiving element and for the diverting element and arranged to exert a higher bias opposing the transmitting element upon one of them than upon the other whereby the receiving element may be actuated at an adjustable point of time in the rotation of the cam.

7. A power transmission system for actuating a plurality of load devices from a rotary prime mover comprising in combination a rotary cam shaft driven by the prime mover, a plurality of cams upon the cam shaft, individual positive displacement liquid transmitters operated by the cams, individual positive displacement liquid receivers mechanically connected one to each load device, individual conduit means forming a liquid column connecting each transmitter with its respective receiver and a positive displacement liquid divertor having an adjustable displacement connected to at least one of the liquid columns whereby the phase relation of the actuating stroke of the one receiver with respect to the stroke phase of another receiver may be varied, said transmitter being single acting, said receiver and divertor being subject to a source of pressurized liquid connected to bias the receiver and divertor in opposition to the transmitter.

8. A power transmission system for actuating a plurality of load devices from a rotary prime mover comprising in combination a rotary cam shaft driven by the prime mover, a plurality of cams upon the cam shaft, individual positive displacement liquid transmitters operated by the cams, individual positive displacement liquid receivers mechanically connected one to each load device, individual conduit means forming a liquid column connecting each transmitter with its respective receiver and a positive displacement liquid divertor having an adjustable displacement connected to at least one of the liquid columns whereby the phase relation of the actuating stroke of the one receiver with respect to the stroke phase of another receiver may be varied, said transmitter being single acting, said receiver and divertor being subject to a source of pressurized liquid connected to bias the receiver and divertor in opposition to the transmitter, the receiver having a different ratio of liquid column area to liquid bias area than the divertor has.

9. A three-position hydraulic motion transmitter comprising a cam having a ramp interrupted by a dwell, a liquid transmitter operated by the cam in one direction, a liquid receiver connected by a liquid column to the transmitter, an output member connected to the receiver, mechanical stops for limiting the stroke of the output member and the displacement of the receiver to a lesser value than the displacement of the transmitter, a liquid divertor connected to the liquid column and having a displacement less than the difference between transmitter and receiver displacements, a reservoir, relief and replenishing valves for passing the remaining displacement difference back and forth between the reservoir and the liquid column, means for unequally biasing the receiver and the divertor in opposition to the transmitter, and means for adjusting the stroke of the divertor to vary the dwell position of the output member with respect to its terminal positions.

10. A three-position hydraulic motion transmitter comprising a cam having a ramp interrupted by a dwell, a liquid transmitter operated by the cam in one direction, a liquid receiver connected by a liquid column to the transmitter, an output member connected to the receiver, adjustable mechanical stops for variably limiting the stroke of the output member and the displacement of the receiver to a lesser value than the displacement of the transmitter, a liquid divertor connected to the liquid column and having a displacement less than the difference between transmitter and receiver displacements, a reservoir, relief and replenishing valves for passing the remaining displacement difference back and forth between the reservoir and the liquid column, means for unequally biasing the receiver and the divertor in opposition to the transmitter, and means for adjusting the stroke of the divertor to vary the dwell position of the output member with respect to its terminal positions.

11. A three-position hydraulic motion transmitter comprising a cam having a ramp interrupted by a dwell, a liquid transmitter operated by the cam in one direction, a liquid receiver connected by a liquid column to the transmitter and biased to drive the transmitter in the opposite direction when permitted by the cam, an output member connected to the receiver, means effective at the start of the transmitter stroke for inhibiting receiver displacement, means effective at the end of the transmitter stroke for also inhibiting receiver displacement, the transmitter having a greater displacement than the receiver, and means for adjusting the duration of inhibition of the receiver whereby the travel distance of the output member from its starting position to the dwell position may be varied.

12. A multiple unit hydraulic motion transmitter comprising a first liquid displacement unit, means to operate the unit to expel and receive liquid, a second liquid displacement unit connected to receive and deliver liquid from and to the first unit, a third liquid displacement unit also connected to receive and deliver liquid from and to the first unit, the displacement of the first unit being at least equal to the combined displacements of the second and third units and means imposing forces on the second and third units in opposition to liquid expelled by the first unit and at different pressures in their respective units whereby the low pressure unit yields through a full stroke to liquid expelled by the first unit before the other unit yields.

13. A multiple unit hydraulic motion transmitter comprising a first liquid displacement unit, means to operate the unit to expel and receive liquid, a second liquid displacement unit connected to receive and deliver liquid from and to the first unit, a third liquid displacement unit also connected to receive and deliver liquid from and to the first unit, the displacement of the first unit being at least equal to the combined displacements of the second and third units and means including a common source of liquid under pressure for biasing the second and third units in a direction to deliver liquid to the first unit, said second unit having a different displacement ratio than the third unit whereby the second and third units move seriatim during a full motion of the first unit.

14. A multiple unit hydraulic motion transmitter comprising a first liquid displacement unit, a rotary cam for operating the unit to expel and receive liquid, a second liquid displacement unit connected to receive and deliver liquid from and to the first unit, a third liquid displacement unit also connected to receive and deliver liquid from and to the first unit, the displacement of the first unit being at least equal to the combined displacements of the second and third units and means imposing forces on the second and third units in opposition to liquid expelled by the first unit and at different pressures in their respective units whereby the low pressure unit yields through a full stroke to liquid expelled by the first unit before the other unit yields.

15. In a liquid column motion transfer system the combination of an expansible chamber type transmitter and at least two expansible chamber type receivers connected in common to the transmitter, one receiver requiring a low operating pressure and the other a high pressure, the transmitter having a total displacement slightly greater than the sum of the displacements of the receivers, a liquid reservoir, and relief and replenishing valves connected between the reservoir and the liquid column to discharge and re-deliver the excess displacement of the transmitter, whereby, when the transmitter is actuated, said one receiver will move through its full stroke before said other receiver starts to move.

16. In a liquid column motion transfer system the combination of an expansible chamber type transmitter and at least two expansible chamber type receivers connected in common to the transmitter, one receiver requiring a low operating pressure and the other a high pressure, the transmitter having a total displacement slightly greater than the sum of the displacements of the receivers, a liquid reservoir, and relief and replenishing valves connected between the reservoir and the liquid column to discharge and re-deliver the excess displacement of the transmitter, whereby, when the transmitter is actuated, said one receiver will move through its full stroke before said other receiver starts to move and means for adjusting the stroke of a receiver to vary the relative timing of a second receiver with respect to the transmitter.

References Cited in the file of this patent

UNITED STATES PATENTS

| | | |
|---|---|---|
| 941,426 | Loudon | Nov. 30, 1909 |
| 1,460,586 | Howse | July 3, 1923 |
| 1,881,185 | Hazelton | Oct. 4, 1932 |
| 2,153,637 | Niven et al. | Apr. 11, 1939 |
| 2,167,501 | Freeman et al. | July 25, 1939 |
| 2,230,335 | Smith | Feb. 4, 1941 |
| 2,260,268 | Warren et al. | Oct. 21, 1941 |
| 2,275,758 | Harris | Mar. 10, 1942 |
| 2,426,695 | Kremiller | Sept. 2, 1947 |
| 2,429,390 | Case | Oct. 21, 1947 |
| 2,609,994 | Gauldie | Sept. 9, 1952 |
| 2,915,016 | Weaver et al. | Dec. 1, 1959 |

FOREIGN PATENTS

| | | |
|---|---|---|
| 151,429 | Austria | Nov. 10, 1937 |
| 997,217 | France | Sept. 12, 1951 |